March 29, 1966    R. F. BUSWELL    3,242,670
SEGMENTED BAFFLE INJECTOR DESIGN
Filed Aug. 27, 1962    2 Sheets-Sheet 1
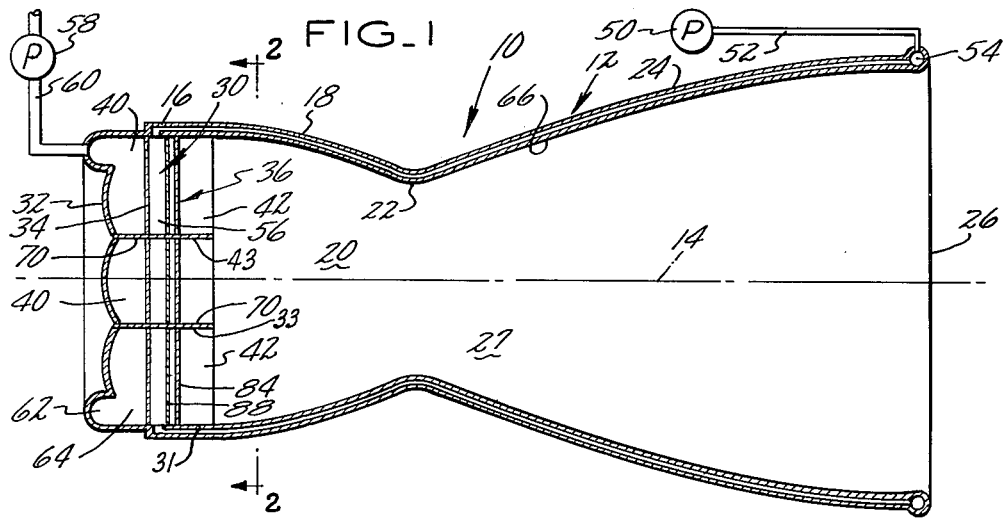
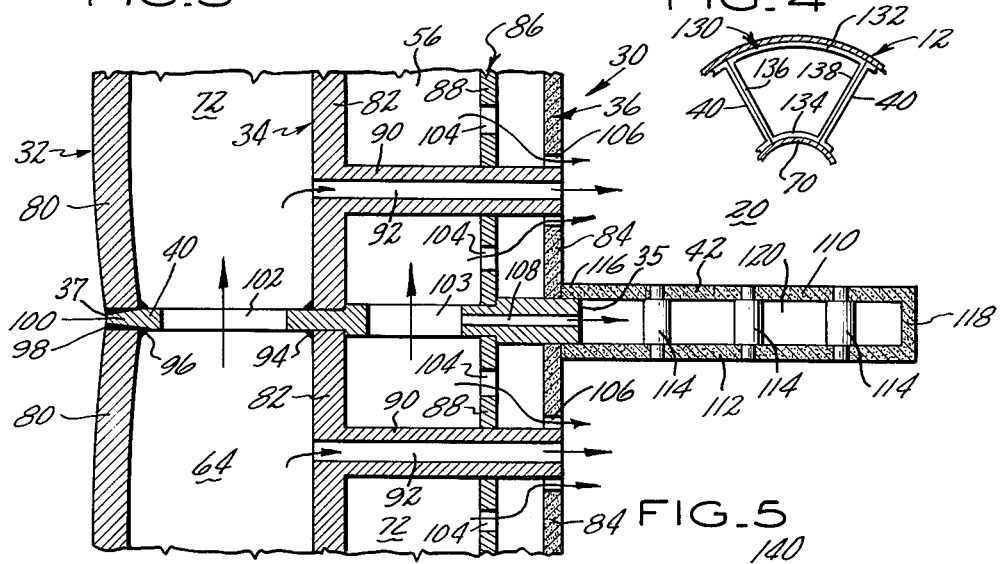
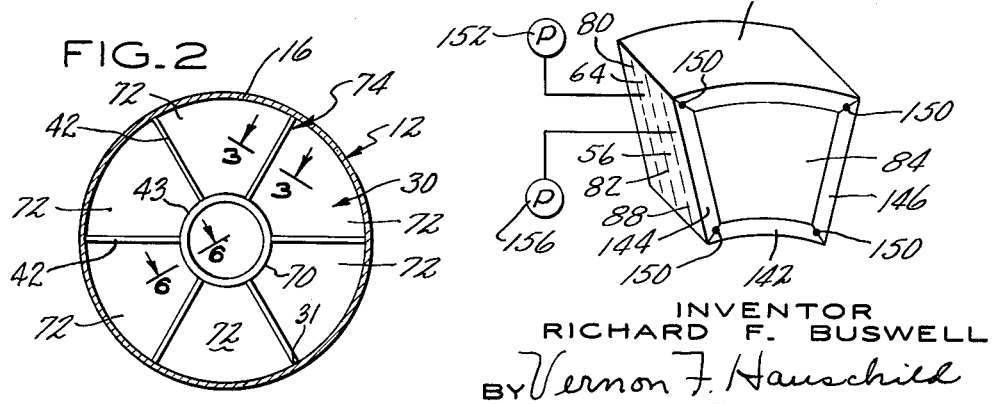
INVENTOR
RICHARD F. BUSWELL
BY Vernon F. Hauschild
ATTORNEY March 29, 1966 R. F. BUSWELL 3,242,670
SEGMENTED BAFFLE INJECTOR DESIGN
Filed Aug. 27, 1962 2 Sheets-Sheet 2

INVENTOR
RICHARD F. BUSWELL
BY Vernon F. Hauschild
ATTORNEY

United States Patent Office 3,242,670
Patented Mar. 29, 1966

3,242,670
SEGMENTED BAFFLE INJECTOR DESIGN
Richard F. Buswell, Wethersfield, Conn., assignor to United Aircraft Corporation, East Hartford, Conn., a corporation of Delaware
Filed Aug. 27, 1962, Ser. No. 220,125
10 Claims. (Cl. 60—35.6)

This invention relates to large liquid propellant rocket engines and more particularly to segmented propellant injector heads and combustion chambers for use therein.

It has been found that the combustion stability of a rocket chamber decreases as the size of the combustion chamber increases. It is therefore desirable to segment the combustion chamber and provide in essence a number of small combustion chambers. It is accordingly a teaching of this invention to provide a segmented or compartmentized combustion chamber for rocket engines and to also provide a segmented propellant injection head which is very stiff and strong to withstand the load on the injector which is greater than the engine thrust and the severe vibrations to which the injector is subjected.

It is a further object of this invention to teach a liquid propellant injector head for a rocket which is segmented such that the segments of the injector head may be inspected and propellant flow checked prior to final assembly of the propellant injector head, and which segmented injector head supports and provides propellant to porous baffles which extend therefrom into and segment the combustion chamber.

It is still a further object of this invention to teach a segmented liquid propellant injector head for a rocket and baffling to segment the rocket combustion chamber such that the frame of the injector head and the baffling are the same shape and comprise a plurality of radial plates, extending between and connected to at least two concentric support ring members.

It is still a further object of this invention to teach a liquid propellant injector head for a rocket which comprises a spider-shaped frame with radially extending, plate-shaped legs forming sector or wedge-shaped chambers therebetween and with at least three circumferential and radially extending plate members positioned in axially spaced relation within said chambers and connected to said legs to form at least two propellant chambers in each of said chambers.

It is still a further object of this invention to teach a liquid propellant injector head made up of several box-shaped structures which are light in weight but strong and stiff in construction.

Other objects and advantages will be apparent from the specification and claims and from the accompanying drawings which illustrate an embodiment of the invention.

FIG. 1 is a cross-sectional showing for a large liquid propellant rocket utilizing my segmented propellant injector head and combustion chamber segmenting baffling.

FIG. 2 is a view taken along line 2—2 of FIG. 1.

FIG. 3 is a view taken along line 3—3 of FIG. 2.

FIG. 4 is a modification of my invention showing a modification of the segmented propellant injector head.

FIG. 5 is a showing of a fixture in which a segment of my segmented propellant injector head may be placed for pressure and propellant flow testing before final assembly.

Figure 6:
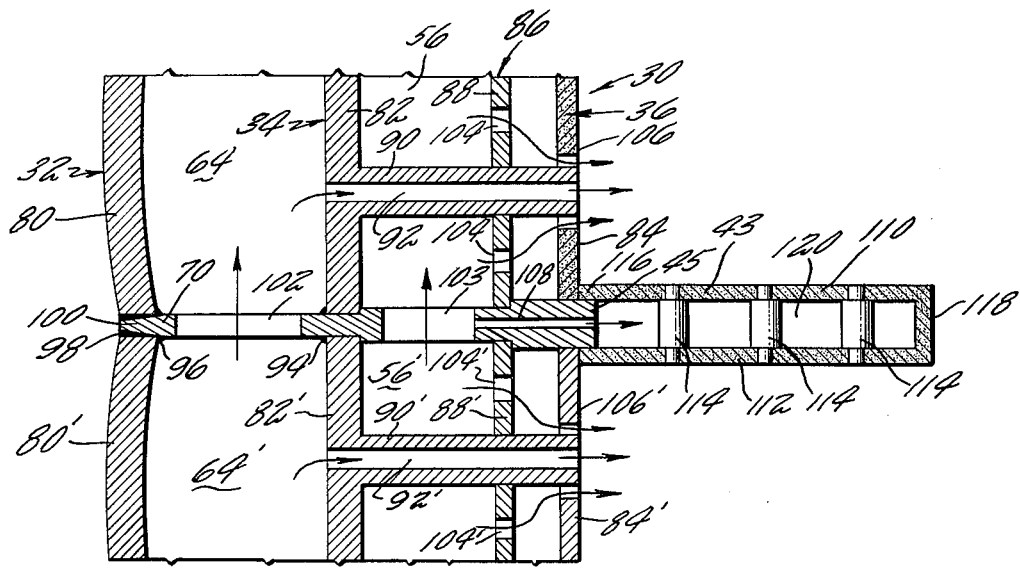
FIG. 6 is a view taken along line 6—6 of FIG. 2.

Referring to FIG. 1 we see large liquid propellant rocket engine 10 which comprises rocket outer case 12, which is of generally circular cross section and concentric about axis 14. Case 12 is substantially cylindrical at its forward portion 16, and then converges at section 18 to define combustion chamber 20 therewithin. After defining throat 22, rocket outer case 12 then diverges at 24 and culminates in exhaust outlet 26. It will be noted that case 12 defines a convergent-divergent passage 27.

Liquid propellant injector head 30 is positioned within case 12 at the forward end thereof within cylindrical section 16. Propellant injector head 30, which will be described in greater particularity hereinafter, consists basically of face plate member 32, which may be curved for greater strength as in FIG. 1 or flat like propellant divider plate 34, injector face plate 36, and radially extending ribs or vanes 40. In a fashion to be described hereinafter, propellant injector head 30 supports and positions baffles 42, which project into combustion chamber 20 and serve both to segment or compartmentize the combustion chamber and aid the distribution of propellant thereinto.

While it will be obvious to those skilled in the art that innumerable suitable fluid propellants may be used with my invention, I shall use two well-known propellants; namely, hydrogen ($H_2$) and liquid oxygen (LOX), in describing my invention.

In operation, and in the fashion more particularly described in U.S. Patent Nos. 2,808,700 and 2,808,701, hydrogen is provided from pump 50, through line 52 into annular heading 54, from whence it flows through passages in the walls of rocket case 12, until it is eventually passed therefrom into hydrogen propellant chamber 56 for distribution into combustion chamber 20. The other propellant, liquid oxygen, is delivered from pump 58, through line 60 into annular header 62, from whence it flows into liquid oxygen propellant chamber 64, and thence into combustion chamber 20. After combustion takes place between the two propellants in combustion chamber 20, the products of combustion pass through nozzle throat 22 and then expand along the expansion surface 66 of the divergent section 24 of rocket case 12 and is eventually discharged to atmosphere through outlet 26 to perform a thrust generating function.

Referring to FIGS. 1, 2 and 3, we see the spider frame 74 of my propellant injector head 30. It will be noted that injector head 30 includes central cylindrical member 70, which is concentrically enveloped within cylindrical section 16 of rocket outer case 12. A plurality of radially extending vanes or ribs 40, which lie in axially extending planes, extend between and are attached to case 12 and inner member 70 by any convenient means such as welding. Ribs 40 have outer edge 31 and inner edge 33, which attach to case 12 and central member 70, respectively. Ribs 40 also have forward side edge 35 which lie in a common radial plane with all rib forward side edges 35 and rear side edge 37, which lie in a common radial plane with all rib rear side edges 37. In this fashion, vanes or ribs 40 cooperate with outer member 12 and inner member 70 to define a plurality of circumferentially positioned and substantially sector-shaped or wedge-shaped chambers 72. In a fashion to be described hereinafter, sector-shaped cavities 72 receive plates 32, 34, and 36 in axially-spaced relation to define propellant cavities 64 and 56 in each cavity 72. It will be obvious to those skilled in the art that as the size of the rocket increases, additional cylindrical members may be placed between members 12 and 70 and vane members similar to vanes 40 will extend therebetween.

Combustion chamber segmenting baffles 42 are made in the same pattern as my injector head spider frame 74, which consists of inner member 70 and ribs 40 and is connected thereto and projects therefrom axially forward into combustion chamber 20.

Now referring to FIG. 3, face plate 32, propellant divider plate 34, and face plate 36 are formed of individual segments, each of which is shaped to correspond to the shape of a sector-shaped or wedge-shaped chamber 72 shown in FIG. 2. Such a sector of each plate is placed in each cavity 72 such that each plate 32, 34, and 36 is both radially and circumferentially extending and is axially spaced from the other plates. These individual sectors of plates 32, 34, and 36 lie in a common radial and circumferentially extending plane with all other corresponding plate sectors to form a complete ring or disc designated as plates 32, 34, and 36. While I will describe the positioning and assembly of the plate sectors in a particular cavity 72, it should be borne in mind that the same assembly and fabrication process is followed in all other cavities. For purposes of clarification, each of the sectors of face plate 32 will be identified as numeral 80, the sectors of propellant divider plates will be identified as numeral 82, and each of the segments of injector face plate 36 will be identified as reference numeral 84. It will be noted that injector face plate 36 preferably includes hydrogen distributor plate 86 which is similarly composed of segments 88.

By way of assembly, sector plates 84 and 88 of injector face plate 36 are positioned between adjacent ribs 40 of a particular cavity 72 and adjacent combustion chamber 20 as best shown in FIG. 3. Sector plates 84 and 88, so positioned, are then welded to adjacent ribs 40 and also to outer and inner members 12 and 70. Sector plate 82 of propellant divider plate 34 is then positioned in this particular cavity 72 approximately midway between the forward and after ends 35 and 37 of ribs 40 and with liquid oxygen spud 90 projecting therefrom and through plate 36 to place combustion chamber 20 into communication with liquid hydrogen propellant chamber 64 through conduit 92. With segment plate 82 so positioned, it is welded to adjacent vanes as at 94 and to outer and inner members 70 and 12, and sector plate 88 is preferably welded to spud 90. In this fashion, sector plates 82, 84, and 88 cooperate to form hydrogen chamber 56.

Sector plate 80 of face plate 32 is then positioned at the end of chamber 72 away from combustion chamber 20 and is welded as shown at 96 and 98 to the tapered end 100 of ribs 40 at end 37. In this fashion, plate segments 80 and 82 define liquid oxygen chamber 64 within a particular cavity 72 and when joined through apertures 102 in rib 40, form a single liquid oxygen chamber 64 between plates or discs 32 and 34. Plates of circular shape are positioned within central member 70 in the same fashion that plates 80, 82, 84, and 88 are positioned in cavity 70 to form a liquid oxygen chamber and a hydrogen chamber therein, which are joined to the segments of chambers 56 and 64 through apertures in central member 70 which are not shown.

As previously described, sector plates 82, 84, and 88 form hydrogen chamber 56 within a particular cavity 72. Apertures 103 join the segments of hydrogen chambers within each cavity 72 to form a single hydrogen cavity 56 between plates 34 and 36 and between the similar plates (not shown) within central member 70. The hydrogen from chamber 56 flows through apertures 104 in plate 86 and thence through apertures 106 surrounding spuds 92 into combustion chamber 20. Face plate 36 is made of porous material so that hydrogen may flow therethrough into combustion chamber 20, thereby cooling the face plate and providing additional propellant into the combustion chamber. Conduits 108 are present in vanes 40 and central member 70 to place hydrogen chamber 56 into communication with the interior of baffles 42 so that hydrogen is also used to cool the walls of baffle 42 and to pass therethrough as additional propellant into combustion chamber 20.

As best shown in FIG. 3, baffle 42 consists of spaced walls 110 and 112, which are held in spaced relation by spacers 114 and which are connected to either vane 40 or central member 70 at their forward ends 116 by welding or the like and which are joined at their aft ends by plate 118, which cooperates with plates 110 and 112 to form propellant cavity 120 within baffle 42.

Plate members 110, 112, and 118 are porous, not only to form the passages of propellant therethrough for cooling and combustion purposes, but also to serve as vibration absorbing media.

While in my preferred embodiment, I utilize cylindrical central member 70, it should be borne in mind that my injector head 30 could be so fabricated that central member 70 is eliminated and chambers 72 would be of pie-shaped cross section. Conversely, as previously mentioned, there could be additional circular members concentric with central member 70.

In describing my preferred embodiment with central member 70 therein, reference is made to FIG. 6.

Central member 70 is concentric about axis 14 and has the inner edges 33 of vanes 40 attached to the outer periphery thereof. Circular plates 80', 82', 84' and 88', which correspond with and lie in the same radial plane, respectively, as segment plates 80, 82, 84 and 88 are positioned within cylindrical member 70 to segment or compartmentize it. Plates 80' and 82' cooperate with central member 70 to define compartment 64', which is joined to propellant compartment 64 through aperture 102. In similar fashion, plates 82' and 84' cooperate with cylindrical member 70 to form propellant compartment 56' which is joined to compartment 56 through aperture 103. Plate 84' is porous as is plate 84 and includes apertures 106 therein to receive spud 90' from plate 82'. Plate 88' includes apertures 104' so that propellant from chamber 56' may pass therethrough and then either through the annular space between apertures 106' and spud 90' or through porous wall or plate 84' into combustion chamber 20. Propellant from compartment 64' may pass through central wall 62' into the combustion chamber 20.

A cylindrical baffle member 43, corresponding to baffle members 42, is attached to and projects into combustion chamber 20 from end 45 of cylindrical member 70. It will be noted that in cross section, baffle member 43 is identical with the cross section of member 42. Baffle member 43 receives propellant from chambers 56 and 56' through conduit 108 for flow through the porous walls thereof into combustion chamber 20. Cylindrical baffle member 43 is attached to the inner ends of the various baffle members 42.

As best shown in FIG. 4, it may be desirable to fabricate complete segments of the injector head such that complete segment units 130 may be snugly fitted into each cavity 72 and then secured in place by any convenient means, such as welding, after propellant pressure and flow checking of the segment unit 130 has taken place. Such a segment unit would consist of outer arcuate member 132 and inner arcuate member 134 joined by radially extending plate members 136 and 138. Segments 80, 82, 84, and 88 of plates 30, 34, and 36, respectively, are welded to members 132–138 in the fashion previously described in connection with the description of FIG. 3.

Each segment of my injector head can be pressure and flow tested in the rig shown in FIG. 5. This rig consists of outer arcuate wall 140, inner arcuate wall 142 and radially extending arcuate walls 144 and 146 joined thereto in sealed relations by the use of seals 150. Sector plates 80, 82, 88, and 84 are positioned to extend between members 140–146 such that the two propellants may be passed from pumps 152 and 156, respectively, into the portion of propellant chambers 64 and 56 which are defined by the aforementioned plate segments.

It is to be understood that the invention is not limited to the specific embodiments herein illustrated and described but may be used in other ways without departure from its spirit as defined by the following claims.

I claim:

1. In a liquid propellant rocket, a rocket case of circular cross-section and concentric about an axis to define a propellant combustion chamber therewithin, a liquid propellant injector head located within said case adjacent said combustion chamber and including a plurality of radially extending ribs each attached to said case and extending radially inwardly therefrom to form sector shaped chambers therebetween and each having a first and second side edge lying respectively in radial planes common to all first edges and to all second edges of said ribs, and each rib also having an outer edge attached to said case and an inner edge, sector-shaped face plates extending between and attached to said first edges of adjacent ribs, sector-shaped propellant divider plates lying in a common radial plane positioned axially between said rib edges and each attached to adjacent ribs to cooperate with said face plates to form a first propellant chamber, sector-shaped injector face plates lying in a common radial plane positioned axially between said divider plates and said second edges of said ribs and each attached to adjacent ribs to cooperate with said divider plates to form a second propellant chamber, conduit means joining said propellant chambers to said combustion chamber, and radially extending baffle plates attached to said rib second edges and projecting into said combustion chamber to compartmentize said combustion chamber.

2. Apparatus according to claim 1 wherein said baffle plates are made of spaced porous walls to define a propellant cavity therewithin.

3. Apparatus according to claim 2 and including conduit means joining said baffle propellant cavity to the interior of one of said propellant chambers.

4. Apparatus according to claim 1 and including a cylindrical member concentrically enveloped within said case and attached to said rib inner ends.

5. Apparatus according to claim 4 including partition means defining third and fourth propellant chambers within said cylindrical member and with said third propellant chamber in communication with said first propellant chamber and said combustion chamber and with said fourth propellant chamber in communication with said second propellant chamber and said combustion chamber.

6. Apparatus according to claim 4 and including a cylindrical baffle member coaxial with and of substantially the same diameter as said cylindrical member and located within and attached to said baffle plates.

7. In a liquid rocket engine, a rocket case of substantially circular cross-section and concentric about an axis to define the rocket combustion chamber, a propellant injector head located within said case adjacent said combustion chamber and including a central cylindrical member concentric about said axis, a plurality of circumferentially positioned, radially extending ribs extending between and connected to said case and said central cylindrical member to form a plurality of circumferentially positioned, substantially wedge-shaped chambers, a series of radially extending substantially wedge-shaped plates positioned in axially spaced relation in each of said wedge-shaped chambers and extending between and connected to said case, said central cylindrical member and adjacent ribs and similar plates located in and connected to said central cylindrical member to form a first and a second propellant chamber in each of said wedge-shaped chambers and within said central cylindrical member, conduit means joining all of said first propellant chambers together and to said combustion chamber, conduit means joining all of said second propellant chambers together and to said combustion chamber, and combustion chamber baffles attached to and extending from said central cylindrical member and said radially extending ribs into said combustion chamber to thereby compartmentize said combustion chamber.

8. Apparatus according to claim 7 wherein said central, cylindrical member is located at one end of said case.

9. Apparatus according to claim 7 wherein said baffles include perforations and further include internal cavities, joined to said perforations and conduit means joining said internal cavities to one of said propellant chambers.

10. In a liquid rocket engine, a rocket case of substantially circular cross-section and concentric about an axis to define the rocket combustion chamber, a propellant injector head located within said case adjacent said combustion chamber and including a central cylindrical member concentric about said axis and a plurality of circumferentially positioned, radially extending ribs extending between and connected to said case and said central cylindrical member to form a plurality of circumferentially positioned, substantially wedge-shaped chambers, a liquid propellant injector head comprising a sector unit of box structure positioned in each of said wedge-shaped chambers each including an outer arcuate member and an inner arcuate member joined by radial end plates and shaped to form a frame to fit snugly into said wedge-shaped chambers and including a series of radially extending, substantially wedge-shaped plates positioned in axially spaced relation in each of said frames and extending between and connected to said outer and inner arcuate members and said end plates of said frame to form propellant chamber in each of said wedge-shaped chambers, conduit means joining all of said first propellant chambers together and to said combustion chamber, conduit means joining all of said second propellant chambers together and to said combustion chamber, and combustion chamber baffles attached to and extending from said central cylindrical member and said radially extending ribs into said combustion chamber to thereby compartmentize said combustion chamber.

References Cited by the Examiner

UNITED STATES PATENTS

| | | | |
|---|---|---|---|
| 2,395,403 | 2/1946 | Goddard | 60—35.6 |
| 2,551,114 | 5/1951 | Goddard | 60—35.6 |
| 2,595,999 | 5/1952 | Way | 60—39.65 |
| 2,703,962 | 3/1955 | Olson | 60—39.74 |
| 2,782,593 | 2/1957 | Lee | 60—39.74 |
| 2,918,118 | 12/1959 | Schirmer | 60—39.74 |
| 3,071,925 | 1/1963 | Ledwith et al. | 60—35.6 |

MARK NEWMAN, *Primary Examiner.*

SAMUEL FEINBERG, *Examiner.*

DOUGLAS HART, *Assistant Examiner.*